(12) United States Patent
Jin et al.

(10) Patent No.: US 9,354,985 B2
(45) Date of Patent: May 31, 2016

(54) DATA PROCESSING DEVICE AND DATA PROCESSING METHOD

(71) Applicant: Huawei Technologies Co., Ltd., Shenzhen, Guangdong (CN)

(72) Inventors: Tianfu Jin, Xi'an (CN); Nunu Ren, Xi'an (CN); Mingjun Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/483,970

(22) Filed: Sep. 11, 2014

(65) Prior Publication Data

US 2015/0154087 A1    Jun. 4, 2015

Related U.S. Application Data

(63) Continuation of application No. PCT/CN2013/088324, filed on Dec. 2, 2013.

(51) Int. Cl.

| | | |
|---|---|---|
| *G06F 11/00* | (2006.01) | |
| *G06F 11/14* | (2006.01) | |
| *G06F 3/06* | (2006.01) | |
| *G06F 11/16* | (2006.01) | |

(52) U.S. Cl.
CPC .......... *G06F 11/1469* (2013.01); *G06F 3/0611* (2013.01); *G06F 3/0614* (2013.01); *G06F 3/0643* (2013.01); *G06F 3/0683* (2013.01); *G06F 11/1441* (2013.01); *G06F 11/1456* (2013.01); *G06F 11/1471* (2013.01); *G06F 11/1612* (2013.01)

(58) Field of Classification Search
CPC ............ G06F 11/1446; G06F 11/1448; G06F 11/1456; G06F 11/1471; G06F 3/0619; G06F 3/065; G06F 3/0683; G06F 2201/84
See application file for complete search history.

(56) References Cited

U.S. PATENT DOCUMENTS

| | | | |
|---|---|---|---|
| 5,721,918 A * | 2/1998 | Nilsson et al. | |
| 7,203,796 B1 * | 4/2007 | Muppalaneni et al. | ........ 711/114 |
| 8,041,679 B1 | 10/2011 | Narayanan | |
| 8,706,988 B2 * | 4/2014 | Yonezawa et al. | ............ 711/162 |
| 2010/0318727 A1 * | 12/2010 | Lee et al. | ...................... 711/103 |
| 2012/0017033 A1 | 1/2012 | Moritoki | |
| 2014/0025865 A1 * | 1/2014 | Marukame et al. | ........... 711/103 |
| 2014/0081911 A1 * | 3/2014 | Deshpande | ................... 707/610 |

(Continued)

FOREIGN PATENT DOCUMENTS

| | | |
|---|---|---|
| CN | 1783025 A | 6/2006 |
| CN | 1940876 A | 4/2007 |
| CN | 101216772 A | 7/2008 |

(Continued)

*Primary Examiner* — Marc Duncan
(74) *Attorney, Agent, or Firm* — Leydig, Voit & Mayer, Ltd.

(57) ABSTRACT

Embodiments of the present invention provide a data processing device and a data processing method. In the data processing device and the data processing method provided by the embodiments of the present invention, first data in a memory is written into a first non-volatile storage unit in a log file form, and a log file of the first data written into the first non-volatile storage unit is written into a second non-volatile storage unit. Because a data write speed of the first non-volatile storage unit is higher than a data write speed of the second non-volatile storage unit, fast backup of the data in the memory can be achieved, and when the data in the memory is lost in an abnormal situation, security of the data in the memory can be ensured.

18 Claims, 12 Drawing Sheets

(56) References Cited

U.S. PATENT DOCUMENTS

| | | | |
|---|---|---|---|
| 2014/0157085 A1* | 6/2014 | Shalvi et al. | 714/768 |
| 2014/0164335 A1* | 6/2014 | Gnech et al. | 707/654 |
| 2014/0195480 A1* | 7/2014 | Talagala et al. | 707/610 |
| 2014/0244896 A1* | 8/2014 | Goss et al. | 711/103 |
| 2015/0135002 A1* | 5/2015 | Harpaz et al. | 714/6.3 |

FOREIGN PATENT DOCUMENTS

| | | |
|---|---|---|
| CN | 101620460 A | 1/2010 |
| CN | 102014152 A | 4/2011 |
| CN | 102467404 A | 5/2012 |
| EP | 0618533 A2 | 10/1994 |
| EP | 0790558 A1 | 8/1997 |

\* cited by examiner

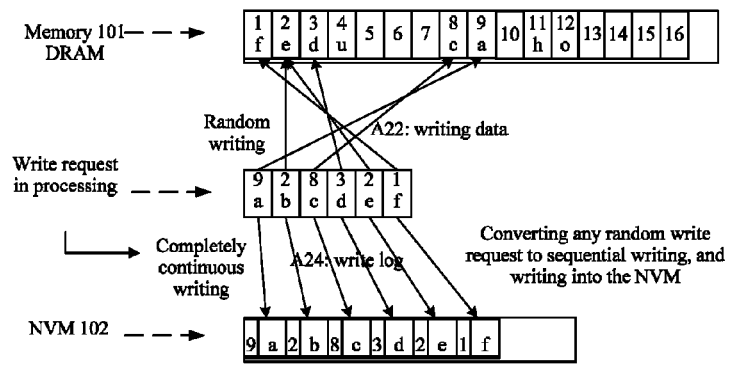
FIG. 7
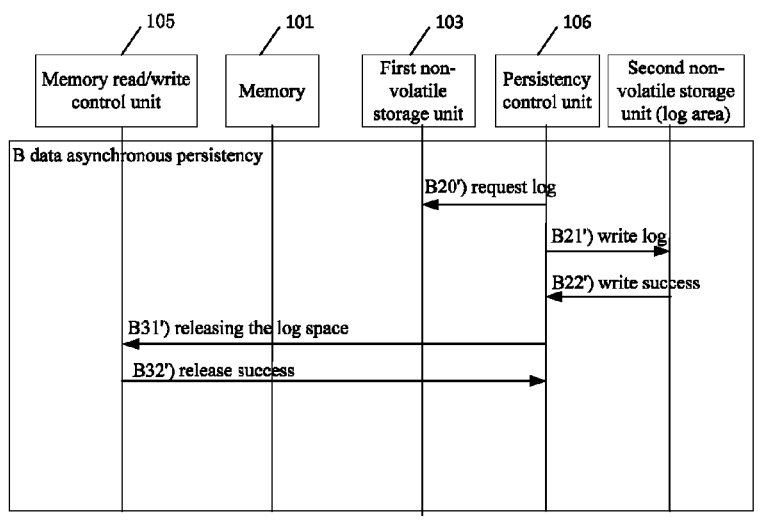
FIG. 8-a

FIG. 8-b

DATA PROCESSING DEVICE AND DATA PROCESSING METHOD

CROSS-REFERENCE TO RELATED APPLICATIONS

This application is a continuation of International Patent Application No. PCT/CN2013/088324, filed on Dec. 2, 2013, which is hereby incorporated by reference in its entirety.

TECHNICAL FIELD

The present invention relates to the field of information technologies, and in particular, to a data processing method and a data processing device.

BACKGROUND

With the continuous development of information technologies and the popularization of mobile services, the quantity of clients significantly increases, which raises a higher requirement for a capability of a server to respond to a client. Meanwhile, with the popularization of big data computing, a requirement for computing instantaneity is raised. A processing speed of a server processing these services directly affects a service processing speed and user satisfaction.

Improving a data read/write speed of a memory is one of factors that improve the service processing speed of the server. In addition, due to a feature that data in the memory is easily lost, the data in the memory is lost upon an abnormal power failure or restart. Generally, a non-volatile storage medium is used to back up the data in the memory to ensure security of the data in the memory. When the data in the memory is lost, the data lost from the memory can be recovered.

The non-volatile storage medium can permanently save the data, and the data is still not lost even in the case of a power failure. A data access speed of a large-capacity non-volatile storage medium is slow, but the data access speed of the memory is fast. If a scenario in which the data is lost from the memory occurs during a process of writing data in the memory into the non-volatile storage medium for backup, the data that is not backed up in a timely manner cannot be recovered. As a result, the security of the data in the memory cannot be ensured.

SUMMARY

Embodiments of the present invention provide a data processing device and a data processing method, to solve a problem that data backup fails due to a low data backup speed when data is written into a memory in an abnormal situation, resulting in a fact that security of the data in the memory is not high.

An embodiment of the present invention provides a data processing device, where the data processing device includes a control unit, a memory, a first non-volatile storage unit, and a second non-volatile storage unit; a data write speed of the first non-volatile storage unit is higher than a data write speed of the second non-volatile storage unit; and the control unit is configured to write first data into the memory, write the first data into the first non-volatile storage unit in a log file form, and write, into the second non-volatile storage unit, a log file of the first data written into the first non-volatile storage unit.

Optionally, the control unit includes a memory read/write control unit and a persistency control unit, where the memory read/write control unit is configured to write the first data into the memory, and write the first data into the first non-volatile storage unit in the log file form; and the persistency control unit is configured to write, into the second non-volatile storage unit, the log file of the first data written into the first non-volatile storage unit.

The memory read/write control unit is further configured to write second data into the memory, and write the second data into the first non-volatile storage unit in the log file form.

Optionally, the persistency control unit is further configured to acquire the first data from the memory and write the first data into the second non-volatile storage unit.

Optionally, the control unit further includes a data scrubbing unit, where the data scrubbing unit is configured to convert the log file of the first data in the second non-volatile storage unit to the first data.

Optionally, the control unit further includes a data recovery unit, where the data recovery unit is configured to recover the first data lost from the memory by using the first data in the second non-volatile storage unit.

Optionally, the data recovery unit is further configured to recover the first data lost from the memory by using the log file of the first data in the second non-volatile storage unit, and recover the second data lost from the memory by using a log file of the second data in the first non-volatile storage unit.

Optionally, the data recovery unit is further configured to recover the first data lost from the memory by using the first data in the second non-volatile storage unit, and recover the second data lost from the memory by using a log file of the second data in the first non-volatile storage unit.

Optionally, the data recovery unit is further configured to recover the first data lost from the memory by using the first data and the log file of the first data in the second non-volatile storage unit, and recover the second data lost from the memory by using a log file of the second data in the first non-volatile storage unit.

Optionally, the persistency control unit is further configured to: after the log file of the first data in the first non-volatile storage unit is written into the second non-volatile storage unit, instruct the first non-volatile storage unit to release space occupied by the log file of the first data.

Optionally, the persistency control unit is further configured to: when the memory read/write control unit writes the second data into the first non-volatile storage unit, suspend writing the log file of the first data in the first non-volatile storage unit into the second non-volatile storage unit.

Optionally, the data write speed of the first non-volatile storage unit is the same as a data write speed of the memory.

An embodiment of the present invention further provides a data processing device, where the data processing device includes a control unit, a memory, a first non-volatile storage unit, and a second non-volatile storage unit; a data write speed of the first non-volatile storage unit is higher than a data write speed of the second non-volatile storage unit; and the control unit is configured to write first data into the memory, and write the first data into the first non-volatile storage unit in a log file form; and the control unit is further configured to acquire the first data from the memory, and convert the acquired first data to a log file and write the converted log file into the second non-volatile storage unit.

Optionally, the control unit includes a memory read/write control unit and a persistency control unit, where the memory read/write control unit is configured to write the first data into the memory, and write the first data into the first non-volatile storage unit in the log file form; and the persistency control unit is configured to acquire the first data from the memory, and convert the acquired first data to a log file and write the converted log file into the second non-volatile storage unit.

Optionally, the memory read/write control unit is further configured to write second data into the memory, and write the second data into the first non-volatile storage unit in the log file form.

Optionally, the persistency control unit is further configured to acquire the first data from the memory and write the first data into the second non-volatile storage unit.

Optionally, the control unit further includes a data scrubbing unit, where the data scrubbing unit is configured to convert the log file of the first data in the second non-volatile storage unit to the first data.

Optionally, the control unit further includes a data recovery unit, where the data recovery unit is configured to recover the first data lost from the memory by using the first data in the second non-volatile storage unit.

Optionally, the data recovery unit is further configured to recover the first data lost from the memory by using the log file of the first data in the second non-volatile storage unit, and recover the second data lost from the memory by using a log file of the second data in the first non-volatile storage unit.

Optionally, the data recovery unit is further configured to recover the first data lost from the memory by using the first data in the second non-volatile storage unit, and recover the second data lost from the memory by using a log file of the second data in the first non-volatile storage unit.

Optionally, the data recovery unit is further configured to recover the first data lost from the memory by using the first data and the log file of the first data in the second non-volatile storage unit, and recover the second data lost from the memory by using a log file of the second data in the first non-volatile storage unit.

Optionally, the data write speed of the first non-volatile storage unit is the same as a data write speed of the memory.

An embodiment of the present invention further provides a data processing device, where the data processing device includes a control unit, a memory, a first non-volatile storage unit, and a second non-volatile storage unit; a data write speed of the first non-volatile storage unit is higher than a data write speed of the second non-volatile storage unit; and the control unit is configured to write first data into the memory, write the first data into the first non-volatile storage unit in a log file form, and write, into the second non-volatile storage unit, the first data in the memory.

Optionally, the control unit includes a memory read/write control unit and a persistency control unit, where the memory read/write control unit is configured to write the first data into the memory, and write the first data into the first non-volatile storage unit in the log file form; and the persistency control unit is configured to write, into the second non-volatile storage unit, the first data in the memory.

Optionally, the memory read/write control unit is further configured to write second data into the memory, and write the second data into the first non-volatile storage unit in the log file form.

Optionally, the control unit further includes a data recovery unit, where the data recovery unit is configured to recover the first data lost from the memory by using the first data in the second non-volatile storage unit.

An embodiment of the present invention provides a data processing method, where the data processing method is applied in a data processing device and the data processing method includes:

receiving first data to be written into a memory of the data processing device;

writing the first data into the memory, and writing the first data into a first non-volatile storage unit in a log file form; and writing, into a second non-volatile storage unit, a log file of the first data written into the first non-volatile storage unit, where a data write speed of the first non-volatile storage unit is higher than a data write speed of the second non-volatile storage unit.

Optionally, the method further includes:

writing second data into the memory, and writing the second data into the first non-volatile storage unit in the log file form.

Optionally, the method further includes: acquiring the first data from the memory and writing the first data into the second non-volatile storage unit.

Optionally, the method further includes: converting the log file of the first data in the second non-volatile storage unit to the first data.

Optionally, when the first data in the memory is lost, recovering the first data by using the first data in the second non-volatile storage unit.

Optionally, when the first data in the memory is lost, recovering the first data lost from the memory by using the log file of the first data in the second non-volatile storage unit; and when the second data in the memory is lost, recovering the second data lost from the memory by using a log file of the second data in the first non-volatile storage unit.

Optionally, when the first data in the memory is lost, recovering the first data lost from the memory by using the first data in the second non-volatile storage unit; and when the second data in the memory is lost, recovering the second data lost from the memory by using a log file of the second data in the first non-volatile storage unit.

Optionally, the recovering the first data lost from the memory by using the first data in the second non-volatile storage unit includes:

determining whether a conversion from the log file of the first data to the first data is completed;

when the conversion is not completed, recovering the first data in the memory by using converted first data and the log file of the first data that is not converted; and when the conversion is completed, recovering the first data in the memory by using converted first data.

Optionally, after the log file of the first data in the first non-volatile storage unit is written into the second non-volatile storage unit, instructing the first non-volatile storage unit to release space occupied by the log file of the first data.

Optionally, after the writing, into a second non-volatile storage unit, a log file of the first data in the first non-volatile storage unit, suspending writing the log file of the first data in the first non-volatile storage unit into the second non-volatile storage unit.

Optionally, the data write speed of the first non-volatile storage unit is the same as a data write speed of the memory.

An embodiment of the present invention further provides another data processing method, where the data processing method is applied in a data processing device and the data processing method includes:

receiving first data to be written into a memory of the data processing device;

writing the first data into the memory, and writing the first data into a first non-volatile storage unit in a log file form; and writing, into a second non-volatile storage unit, the first data written into the memory, where a data write speed of the first non-volatile storage unit is higher than a data write speed of the second non-volatile storage unit.

Optionally, the method further includes:

writing second data into the memory, and writing the second data into the first non-volatile storage unit in the log file form.

Optionally, the writing, into a second non-volatile storage unit, the first data written into the memory includes:

writing, into the second non-volatile storage unit, the first data written into the memory; or after the first data written into the memory is converted to a log file, writing the converted log file into the second non-volatile storage unit.

Optionally, the method further includes:

after the first data written into the memory is converted to the log file and the converted log file is written into the second non-volatile storage unit, converting the log file of the first data in the second non-volatile storage unit to the first data.

Optionally, when the first data in the memory is lost, if the first data is stored in the second non-volatile storage unit, recovering the first data by using the first data in the second non-volatile storage unit; if only the log file of the first data is stored in the second non-volatile storage unit, recovering the first data lost from the memory by using the log file of the first data; and if the first data in the memory is lost during a process of converting the log file of the first data in the second non-volatile storage unit to the first data, recovering the first data in the memory by using converted first data and the log file of the first data that is not converted.

Optionally, when the second data in the memory is lost, recovering the second data lost from the memory by using a log file of the second data in the first non-volatile storage unit.

Optionally, the recovering the first data lost from the memory by using the first data in the second non-volatile storage unit includes:

determining whether a conversion from the log file of the first data to the first data is completed;

when the conversion is not completed, recovering the first data in the memory by using converted first data and the log file of the first data that is not converted; and when the conversion is completed, recovering the first data in the memory by using converted first data.

Optionally, the data write speed of the first non-volatile storage unit is the same as a data write speed of the memory.

An embodiment of the present invention further provides a data processing method, where the data processing method is applied in a data processing device and the data processing method includes:

receiving first data to be written into a memory of the data processing device;

writing the first data into the memory, and writing the first data into a first non-volatile storage unit in a log file form; and converting the first data in the memory to a log file, and writing the converted log file into a second non-volatile storage unit, where a data write speed of the first non-volatile storage unit is higher than a data write speed of the second non-volatile storage unit.

Optionally, the method further includes:

writing second data into the memory, and writing the second data into the first non-volatile storage unit in the log file form.

Optionally, the method further includes:

writing the first data in the memory into the second non-volatile storage unit.

Optionally, the method further includes:

converting the log file of the first data in the second non-volatile storage unit to the first data.

Optionally, when the first data in the memory is lost, recovering the first data lost from the memory by using the first data in the second non-volatile storage unit.

Optionally, when the first data in the memory is lost, recovering the first data lost from the memory by using the log file of the first data in the second non-volatile storage unit; and when the second data in the memory is lost, recovering the second data lost from the memory by using a log file of the second data in the first non-volatile storage unit.

Optionally, when the first data in the memory is lost, recovering the first data lost from the memory by using the first data in the second non-volatile storage unit; and when the second data in the memory is lost, recovering the second data lost from the memory by using a log file of the second data in the first non-volatile storage unit.

Optionally, the recovering the first data lost from the memory by using the first data in the second non-volatile storage unit includes:

determining whether a conversion from the log file of the first data to the first data is completed;

when the conversion is not completed, recovering the first data in the memory by using converted first data and the log file of the first data that is not converted; and when the conversion is completed, recovering the first data in the memory by using converted first data.

Optionally, the data write speed of the first non-volatile storage unit is the same as a data write speed of the memory.

An embodiment of the present invention further provides a data processing method, where the data processing method is applied in a data processing device and the data processing method includes:

receiving first data to be written into a memory of the data processing device;

writing the first data into the memory, and writing the first data into a first non-volatile storage unit in a log file form; and writing the first data in the memory into a second non-volatile storage unit, where a data write speed of the first non-volatile storage unit is higher than a data write speed of the second non-volatile storage unit.

Optionally, writing second data into the memory, and writing the second data into the first non-volatile storage unit in the log file form.

Optionally, when the first data in the memory is lost, recovering the first data by using the first data in the second non-volatile storage unit.

Optionally, the data write speed of the first non-volatile storage unit is the same as a data write speed of the memory.

In the data processing device and the data processing method provided by the embodiments of the present invention, the first data written into the memory is written into the first non-volatile storage unit in the log file form, and the log file of the first data written into the first non-volatile storage unit is written into the second non-volatile storage unit. Because the data write speed of the first non-volatile storage unit is higher than the data write speed of the second non-volatile storage unit, fast backup of the data in the memory can be achieved, and when the data in the memory is lost in an abnormal situation, security of the data in the memory can be ensured.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 7 is a schematic diagram of a specific implementation manner for writing service data into a memory and a first non-volatile storage unit in FIG. 5;

FIG. 8-b is a schematic flowchart of acquiring a log file of first data from a memory and performing data persistency in FIG. 5;

DESCRIPTION OF EMBODIMENTS

The following clearly and describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
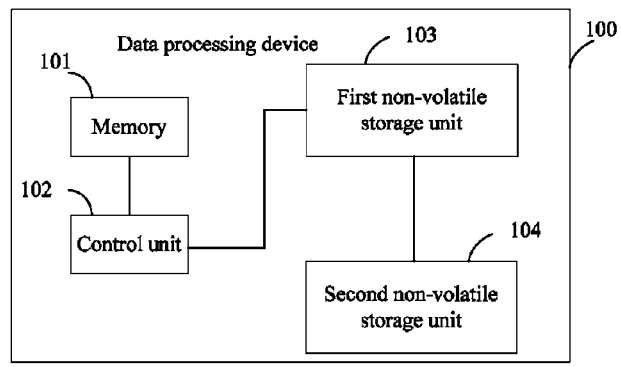
FIG. 1 is a schematic structural diagram of a data processing device according to an embodiment of the present invention.

Refer to FIG. 1, which is a schematic structural diagram of a data processing device 100 according to an embodiment of the present invention. The data processing device 100 includes a memory 101, a control unit 102, a first non-volatile storage unit 103, and a second non-volatile storage unit 104; a data write speed of the first non-volatile storage unit 103 is higher than a data write speed of the second non-volatile storage unit 104; and the control unit 102 is configured to write first data into the memory 101, write the first data into the first non-volatile storage unit 103 in a log file form, and write, into the second non-volatile storage unit 104, a log file of the first data written into the first non-volatile storage unit 103.

In the foregoing data processing device 100, the control unit 102 writes, into the first non-volatile storage unit 103 in the log file form, the first data written into the memory 101, and writes, into the second non-volatile storage unit 104, the log file of the first data written into the first non-volatile storage unit 103. Because the data write speed of the first non-volatile storage unit 103 is higher than the data write speed of the second non-volatile storage unit 104, fast backup of service data can be achieved, and especially for service data in the memory that needs to be stored by a storage processing device, the security of the memory data can be ensured. Meanwhile, the first data is stored in the log file form, and the log file has metadata and can record only changed data and can implement data recovery; therefore when a capacity of the first non-volatile storage unit 103 is smaller than a capacity of the memory 101, fast data backup can be achieved and data lost from the memory can be recovered when the data in the memory is lost.

As another optional implementation manner, the control unit 102 is further configured to write the first data into the memory 101, write the first data into the first non-volatile storage unit 103 in the log file form, and write, into the second non-volatile storage unit 104, the first data written into the memory. The first data is converted to the log file, the converted log file is written into the first non-volatile storage unit 103, and the first data written into the memory is written into the second non-volatile storage unit 104, so that separation of read and write of the first non-volatile storage unit 103 can be achieved, thereby avoiding that the first non-volatile storage unit 103 simultaneously processes a data read request of the second non-volatile storage unit 104 while writing data, and further improving log file writing efficiency of the first non-volatile storage unit 103.

As an optional implementation manner, the data write speed of the first non-volatile storage unit 103 is the same as or close to a data write speed of the memory. In this way, it can be ensured that the data written into the memory 101 is synchronized to the first non-volatile storage unit 103. When data is lost from the memory 101 due to an abnormality, the log file in the first non-volatile storage unit 103 can be used to recover lost data.

Figure 2:
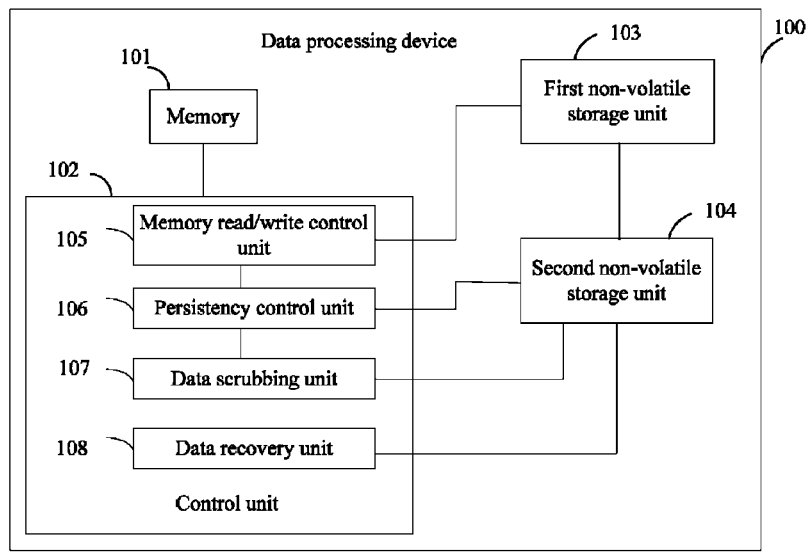
FIG. 2 is a schematic diagram of a specific implementation manner of a data processing device according to an embodiment of the present invention.

Refer to FIG. 2, which is a schematic diagram of a specific implementation manner of a data processing device 100 according to an embodiment of the present invention. As shown in FIG. 2, the control unit 100 may include a memory read/write control unit 105 and a persistency control unit 106, where the memory read/write control unit 105 is configured to write the first data into the memory 101, and write the first data into the first non-volatile storage unit 103 in the log file form; and the persistency control unit 106 is configured to write, into the second non-volatile storage unit 104, the log file of the first data written into the first non-volatile storage unit 103.

As another implementation manner, the memory read/write control unit 105 is configured to write the first data into the memory 101, and write the first data into the first non-volatile storage unit 103 in the log file form; and the persistency control unit 106 is configured to write, into the second non-volatile storage unit 104, the first data in the memory. The persistency control unit 106 is further configured to convert the first data in the memory 101 to the log file and write the converted log file into the second non-volatile storage unit 104.

Optionally, the memory read/write control unit 105 is further configured to write second data into the memory 101, and write the second data into the first non-volatile storage unit 103 in the log file form.

The second data is stored in the first non-volatile storage unit 103 in the log file form. When the data in the memory 101 is lost, lost data can be recovered by using the data in the first non-volatile storage unit 103. Especially, the second data may be the changed data among the data in the memory. Because the log file includes the metadata and can implement data recovery according to the metadata and the changed data, when storage space of the first non-volatile storage unit 103 is smaller than space of the memory 101, data recovery can be achieved when data is lost from the memory due to an abnormality.

Optionally, the data control unit further includes a data scrubbing unit 107, configured to convert the log file of the first data in the second non-volatile storage unit 104 to the first data.

Accordingly, the control unit 102 further includes a data recovery unit 108, configured to recover the first data lost from the memory by using the first data in the second non-volatile storage unit 104.

As another optional implementation manner, the persistency control unit 106 is further configured to acquire the first data from the memory 101 and write the first data into the second non-volatile storage unit 104. In this way, the second non-volatile storage unit 104 does not need to convert the log file of the first data to the first data, thereby further improving the data processing efficiency of the data processing device.

When the data in the memory 101 is lost before the second non-volatile storage unit 104 starts to convert the log file of the first data to the first data, the data recovery unit 108 recovers the first data lost from the memory 101 by using the log file of the first data in the second non-volatile storage unit 104, and recovers the second data lost from the memory 101 by using the log file of the second data in the first non-volatile storage unit 103.

If the data in the memory 101 is lost after the second non-volatile storage unit 104 has completed a conversion of the log file of the first data to the first data, the data recovery unit 108 recovers the first data lost from the memory 101 by using the first data in the second non-volatile storage unit 104, and recovers the second data lost from the memory by using the log file of the second data in the first non-volatile storage unit 103.

If the data in the memory 101 is lost when the second non-volatile storage unit 104 has not completed the conversion of the log file of the first data to the first data, the data recovery unit 108 is further configured to recover the first data lost from the memory by using the first data and the log file of the first data in the second non-volatile storage unit, and recover the second data lost from the memory by using the log file of the second data in the first non-volatile storage unit 103. That is, the data recovery unit 108 recovers the first data in the memory 101 by using the first data part that has been converted and the log file part of the first data that is not converted.

The data recovery unit 108 recovers the data lost from the memory 101, so that the memory 101 achieves fast data read and write. When the data in the memory 101 is lost, the lost data can be recovered in a timely manner, thereby ensuring service data security.

As an optional implementation manner, the persistency control unit 106 is further configured to: after the log file of the first data in the first non-volatile storage unit 103 is written into the second non-volatile storage unit 104, instruct the first non-volatile storage unit 103 to release space occupied by the log file of the first data. In this way, the first non-volatile storage unit 103 can circularly store the data that is written into the memory 101, thereby improving usage of the first non-volatile storage unit 103.

As an optional implementation manner, the persistency control unit 106 is further configured to: when the memory read/write control unit 105 writes the second data into the first non-volatile storage unit 103, suspend writing the log file of the first data in the first non-volatile storage unit 103 into the second non-volatile storage unit 104. In this way, the first non-volatile storage unit 103 can achieve pure continuous writing. Relative to a case in which data is read from the first non-volatile storage unit while data is written into the first non-volatile storage unit 103, the data write speed of the first non-volatile storage unit 103 is improved.

The memory in the foregoing data processing device may be a dynamic random access memory DRAM, and the first non-volatile storage unit may be an NVM (Non-Volatile Memory, non-volatile memory). The embodiment of the present invention does not limit the specific implementation manner.

Figure 3:
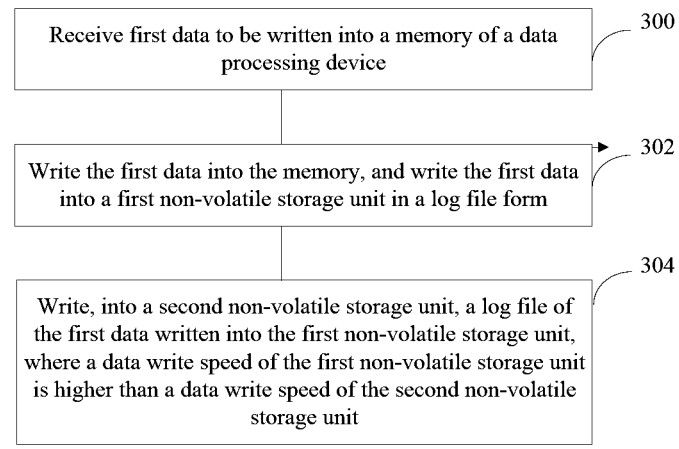
FIG. 3 is a schematic flowchart of a data processing method according to an embodiment of the present invention.

Refer to FIG. 3, which is a schematic flowchart of a data processing method according to an embodiment of the present invention, where the data processing method is applied in a data processing device and includes:

Step 300: Receive first data to be written into a memory of the data processing device.

Step 302: Write the first data into the memory, and write the first data into a first non-volatile storage unit in a log file form.

Step 304: Write, into a second non-volatile storage unit, a log file of the first data written into the first non-volatile storage unit, where a data write speed of the first non-volatile storage unit is higher than a data write speed of the second non-volatile storage unit.

The first data written into the memory is written into the first non-volatile storage unit in the log file form, and the log file of the first data written into the first non-volatile storage unit is written into the second non-volatile storage unit. Because the data write speed of the first non-volatile storage unit is higher than the data write speed of the second non-volatile storage unit, fast backup of service data can be achieved, and especially for service data in the memory that needs to be stored by a storage processing device, the security of the memory data can be ensured. Meanwhile, the first data is stored in the log file form, and the log file has metadata and can record only changed data and can implement data recovery; therefore when a capacity of the first non-volatile storage unit is smaller than a capacity of the memory, fast data backup can be achieved and data lost from the memory can be recovered when the data in the memory is lost.

Optionally, the data write speed of the first non-volatile storage unit is the same as or close to a data write speed of the memory. In this way, it can be ensured that the data written into the memory is synchronized to the first non-volatile storage unit. When data is lost from the memory due to an abnormality, the log file in the first non-volatile storage unit can be used to recover lost data.

Figure 4:
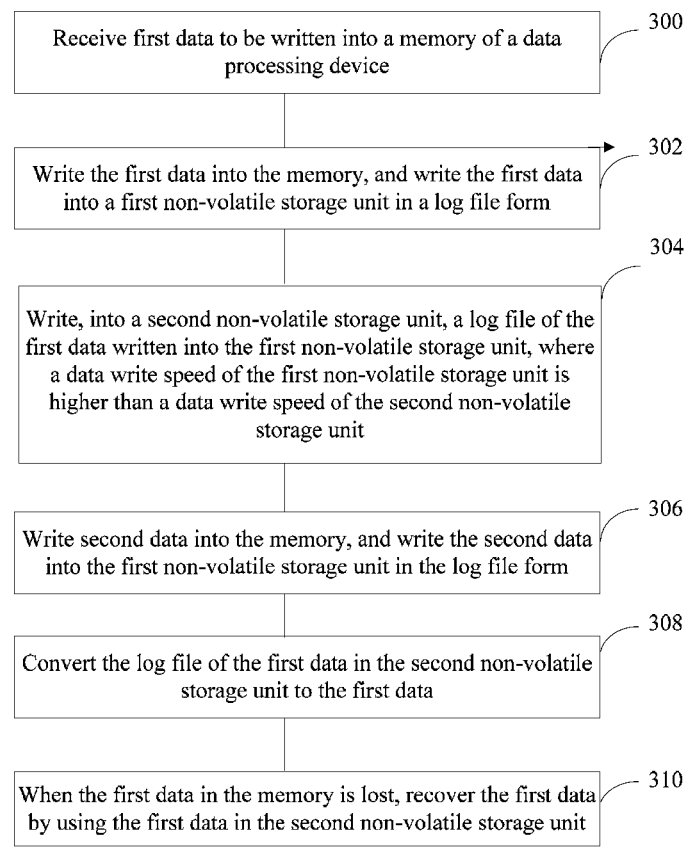
FIG. 4 is a schematic flowchart of a specific implementation of a data processing method according to an embodiment of the present invention.

Refer to in FIG. 4, which is a schematic diagram of a specific implementation of a data processing method according to an embodiment of the present invention. As shown in FIG. 4, the data processing method according to the embodiment of the present invention further includes:

Step 306: Write second data into the memory, and write the second data into the first non-volatile storage unit in the log file form.

The data is stored in the first non-volatile storage unit in the log file form. When the data in the memory is lost, lost data can be recovered by using the data in the first non-volatile storage unit. Especially, the second data may be changed data among the data in the memory. Because the log file includes the metadata and can implement data recovery according to the metadata and the changed data, when storage space of the first non-volatile storage unit is smaller than space of the memory, data recovery can be achieved when data in the memory is lost due to an abnormality.

The method may further include:

Step 308: Convert the log file of the first data in the second non-volatile storage unit to the first data; optionally, after step 306, the method may further include: acquiring the first data from the memory and writing the first data into the second non-volatile storage unit. In this way, step 308 does not need to be performed, thereby further improving the data back efficiency.

Step 310: When the first data in the memory is lost, recover the first data by using the first data in the second non-volatile storage unit. Specifically, the method may include: when the first data in the memory is lost, if the first data is stored in the second non-volatile storage unit, recovering the first data by using the first data in the second non-volatile storage unit; if only the log file of the first data is stored in the second non-volatile storage unit, recovering the first data lost from the memory by using the log file of the first data; and if the first data in the memory is lost during a process of converting the log file of the first data in the second non-volatile storage unit to the first data, recovering the first data in the memory by using converted first data and the log file of the first data that is not converted.

Optionally, when the second data in the memory is lost, the second data lost from the memory is recovered by using a log file of the second data in the first non-volatile storage unit.

Optionally, the recovering the first data lost from the memory by using the first data in the second non-volatile storage unit includes: determining whether a conversion from the log file of the first data to the first data is completed; when the conversion is not completed, recovering the first data in the memory by using converted first data and the log file of the first data that is not converted; and when the conversion is completed, recovering the first data in the memory by using converted first data.

Fast data read/write of the memory is achieved by using the foregoing manner of recovering the data lost from the memory. When the data in the memory is lost, the lost data can be recovered in a timely manner, thereby ensuring service data security.

As another aspect of the embodiment of the present invention, the foregoing method may further include: after the log file of the first data in the first non-volatile storage unit is written into the second non-volatile storage unit, instructing the first non-volatile storage unit to release space occupied by the log file of the first data. In this way, the first non-volatile storage unit can circularly store the data written into the memory, thereby improving usage of the first non-volatile storage unit.

As another aspect of the embodiment of the present invention, the method may further include: when the second data is written into the first non-volatile storage unit in the log file form, suspending writing the log file of the first data in the first non-volatile storage unit into the second non-volatile storage unit. In this way, the first non-volatile storage unit can achieve pure continuous writing. Relative to a case in which data is read from the first non-volatile storage unit while data is written into the first non-volatile storage unit, the data write speed of the first non-volatile storage unit is improved.

In the foregoing steps: the memory may be a dynamic random access memory DRAM (Dynamic Random Access Memory, dynamic random access memory), and the first non-volatile storage unit may be an NVM. The embodiment of the present invention does not limit the specific implementation manner.

Figure 11:
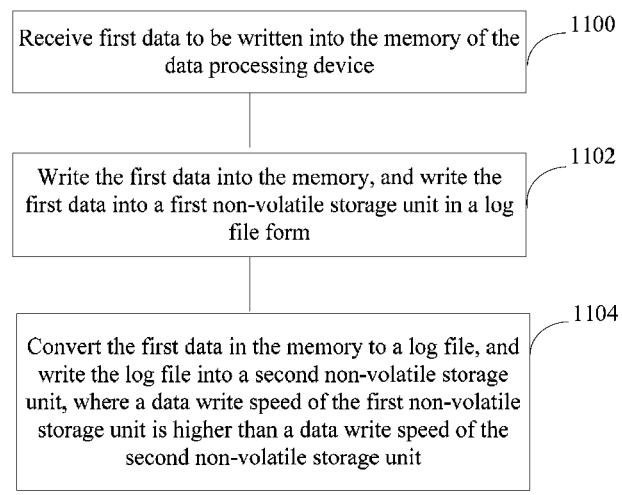
FIG. 11 is a schematic flowchart of another data processing method according to an embodiment of the present invention.

Refer to FIG. 11, which is a schematic flowchart of another data processing method according to an embodiment of the present invention, where the data processing method is applied in a data processing device and includes:

Step 1100: Receive first data to be written into a memory of the data processing device.

Step 1102: Write the first data into the memory, and write the first data into a first non-volatile storage unit in a log file form.

Step 1104: Convert the first data in the memory to a log file, and write the converted log file into a second non-volatile storage unit, where a data write speed of the first non-volatile storage unit is higher than a data write speed of the second non-volatile storage unit.

The first data written into memory is written into the first non-volatile storage unit in the log file form, and the first data in the memory is converted to the log file and the converted log file is written into the second non-volatile storage unit. Because the data write speed of the first non-volatile storage unit is higher than the data write speed of the second non-volatile storage unit, fast backup of service data can be achieved, and especially for service data in the memory that needs to be stored by a storage processing device, the security of the memory data can be ensured. Meanwhile, the first data is stored in the log file form, and the log file has metadata and can record only changed data and can implement data recovery; therefore when a capacity of the first non-volatile storage unit is smaller than a capacity of the memory, fast data backup can be achieved and data lost from the memory can be recovered when the data in the memory is lost.

Figure 12:
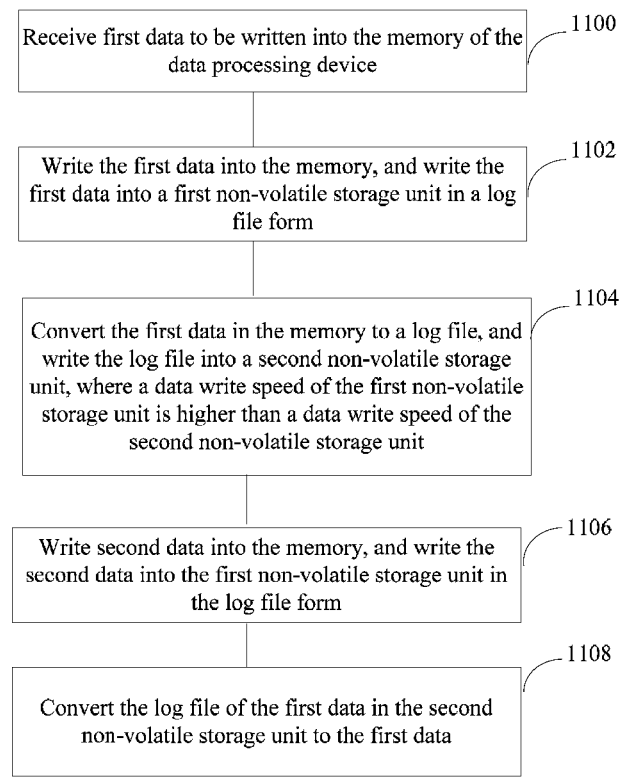
FIG. 12 is schematic flowchart of a further implementation of the method described in FIG. 11.

Refer to FIG. 12, which is a schematic flowchart of a further implementation of the method shown in FIG. 11. The method further includes:

Step 1106: Write second data into the memory, and write the second data into the first non-volatile storage unit in the log file form.

Step 1108:

Convert the log file of the first data in the second non-volatile storage unit to the first data.

The log file of the first data in the second non-volatile storage unit is converted to the first data, so that the first data in the memory can be recovered by using the first data in the second non-volatile storage unit when the first data in the memory is lost.

As an optional implementation manner, the first data in the memory may further be written into the second non-volatile storage unit. In this way, a step of converting the log file of the first data in the second non-volatile storage unit to the first data is omitted, thereby further improving data storage efficiency.

When the first data in the memory is lost, the first data lost from the memory can be recovered by using the first data in the second non-volatile storage unit. The log file of the first data in the second non-volatile storage unit can also be used to recover the first data lost from the memory. If a loss of the first data in the memory occurs during a process of converting the log file of the first data in the second non-volatile storage unit, the method may further include: determining whether a conversion from the log file of the first data to the first data is completed; when the conversion is not completed, recovering the first data in the memory by using converted first data and the log file of the first data that is not converted; and when the conversion is completed, recovering the first data in the memory by using converted first data.

Optionally, when the second data in the memory is lost, the second data lost from the memory is recovered by using a log file of the second data in the first non-volatile storage unit.

Fast data read/write of the memory is achieved by using the foregoing manner of recovering the data lost from the memory. When the data in the memory is lost, the lost data can be recovered in a timely manner, thereby ensuring service data security.

Figure 13:
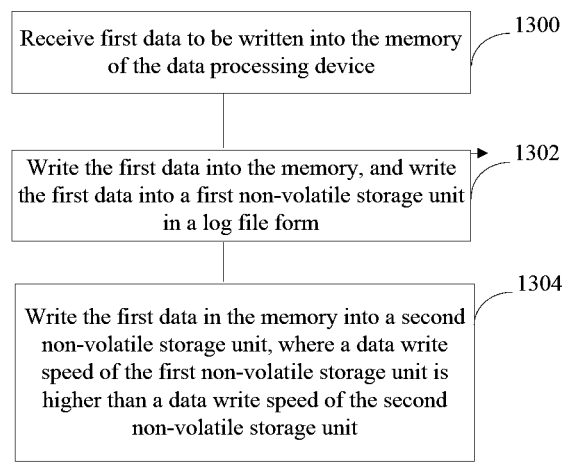
FIG. 13 is a schematic flowchart of another data processing method according to an embodiment of the present invention.

Refer to FIG. 13, which is a schematic flowchart of another data processing method according to an embodiment of the present invention, where the data processing method is applied in a data processing device and includes:

Step 1300: Receive first data to be written into a memory of the data processing device.

Step 1302: Write the first data into the memory, and write the first data into a first non-volatile storage unit in a log file form.

Step 1304: Write the first data in the memory into a second non-volatile storage unit, where a data write speed of the first non-volatile storage unit is higher than a data write speed of the second non-volatile storage unit.

The first data written into memory is written into the first non-volatile storage unit in the log file form, and the first data in the memory is written into the second non-volatile storage unit. Because the data write speed of the first non-volatile storage unit is higher than the data write speed of the second non-volatile storage unit, fast backup of service data can be achieved, and especially for service data in the memory that needs to be stored by a storage processing device, the security of the memory data can be ensured. Meanwhile, the first data is stored in the log file form, and the log file has metadata and can record only changed data and can implement data recovery; therefore when a capacity of the first non-volatile storage unit is smaller than a capacity of the memory, fast data backup can be achieved and data lost from the memory can be recovered when the data in the memory is lost.

Optionally, the method further includes: writing second data into the memory, and writing the second data into the first non-volatile storage unit in the log file form.

Optionally, when the first data in the memory is lost, the first data is recovered by using the first data in the second non-volatile storage unit.

Optionally, the data write speed of the first non-volatile storage unit is the same as a data write speed of the memory.

Fast data read/write of the memory is achieved by using the foregoing manner of recovering the data lost from the memory. When the data in the memory is lost, the lost data can be recovered in a timely manner, thereby ensuring service data security.

The following describes in detail the implementation manners of the data processing device and the data processing method according to the embodiments of the present invention by using a server as an example. The data processing device may be a server, including a hardware device, such as a CPU, a memory, a system bus, a power supply, and software run in the hardware, such as an operating system. The operating system is described by using a Linux operating system as an example. A block device subsystem in the Linux operating system of the server is connected to the memory of the server, and reads service data from the memory, or writes the service data into the memory.

Figure 5:
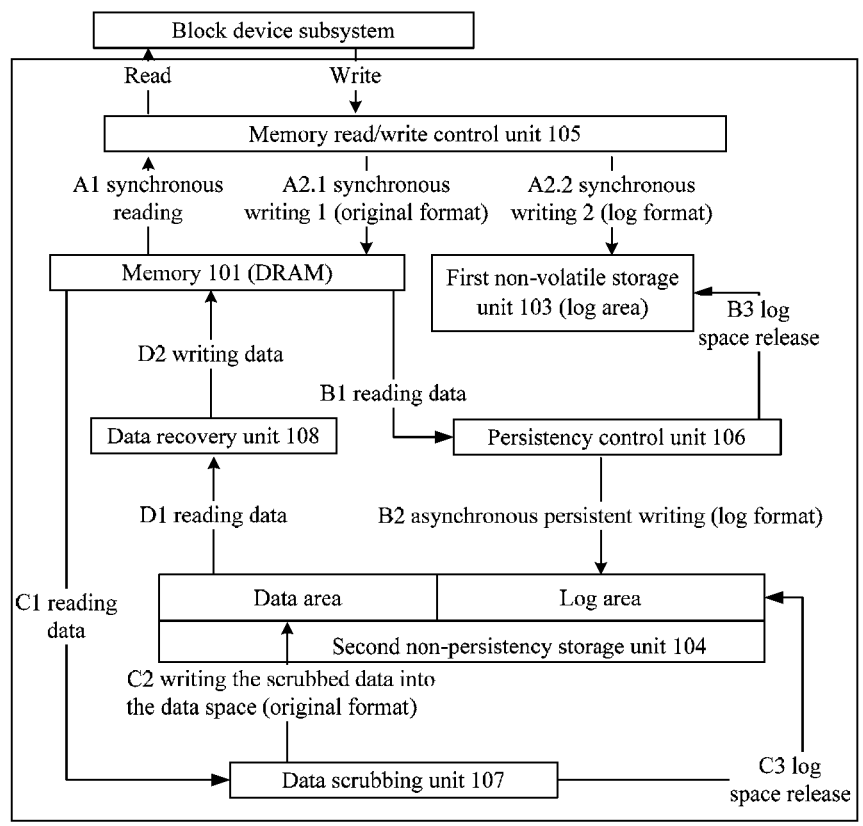
FIG. 5 is a schematic structural diagram of a specific application of a data processing device in a server according to an embodiment of the present invention.

Refer to FIG. 5, which is a schematic structural diagram of a specific application of a data processing device in a server according to an embodiment of the present invention. A memory read/write control unit 105 in FIG. 5 is connected to the block device subsystem to perform service data read/write control, and store, in a memory 101, all service data that needs to be stored, where the memory 101 may be a DRAM. Meanwhile, the memory read/write control unit 105 stores, in a log area of a first non-volatile storage unit 103 in a log file form, the data that needs to be written into the memory 101. A persistency control unit 106 reads the service data from the memory 101 and stores the service data in a log area of a second non-volatile storage unit 104, where the log area of the second non-volatile storage unit 104 stores the service data in the log file form, and a data area stores an original format of the service data. Meanwhile, a data scrubbing unit 107 further scrubs, to the data area, the data in the log area of the second non-volatile storage unit 104 or the data in the log area of the first non-volatile storage unit 103, and deletes the log file in the corresponding log area to release space occupied by the log file. When the service data in the memory 101 is lost, a data recovery unit 108 reads the data in the data area of the persistency storage unit and recovers the data to the memory 101, or recovers the data lost from the memory 101 by using the log file in the first non-volatile storage unit 103 or the second non-volatile storage unit 104.

Table 1 describes model selection examples of high-speed storage mediums, namely, the first non-volatile storage unit 103 and the second non-volatile storage unit 104 (only a part of combinations are listed).

TABLE 1

|  | Model Selection of the First Non-volatile Storage Unit 103 | Model Selection of the Second Non-volatile Storage Unit 104 |
| --- | --- | --- |
| Combination 1 | NVDIMM (Non-Volatile Dual In-line Memory Module, non-volatile dual in-line memory module) and NVRAM (Non-Volatile Random Access Memory, non-volatile random access memory) | SSD (Solid State Disk, solid state disk) and HD (Hard Disk, hard disk) |
| Combination 2 | SSD | HD |
| Combination 3 (low-cost combination) | High-speed HD | Low-speed HD |
| Combination 4 | NVDIMM, NVRAM | Remote storage |
| Combination 5 | Remote NVDIMM and NVRAM | Remote storage |

Figure 6:
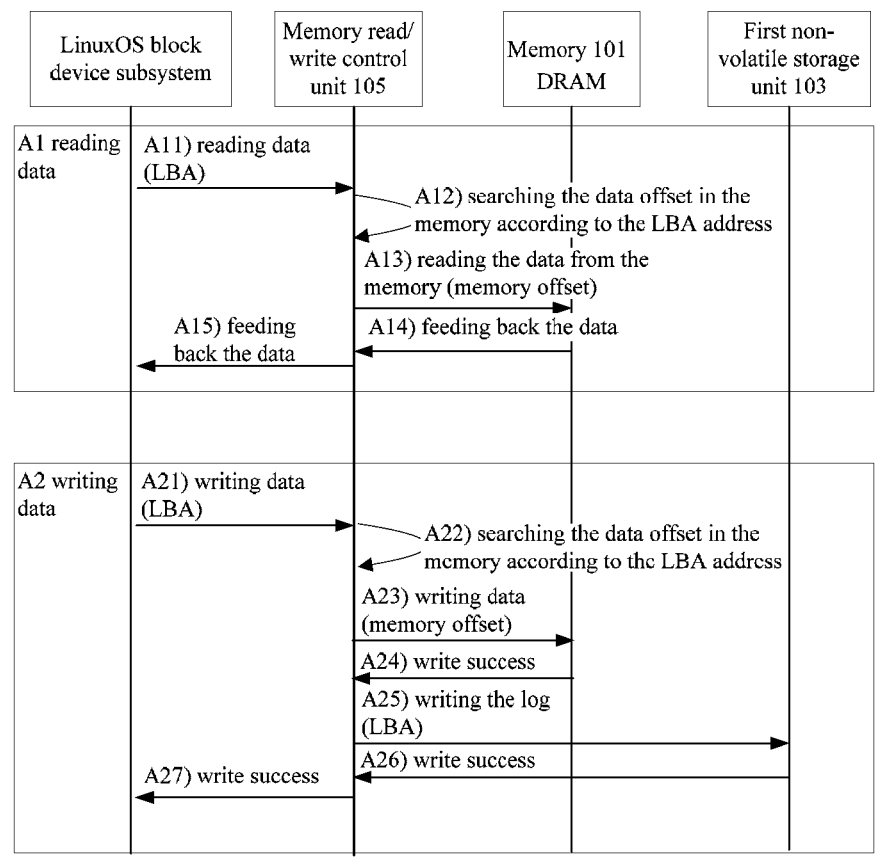
FIG. 6 is a schematic flowchart of a data read/write process performed by a memory read/write control unit and a memory in FIG. 5.

Refer to FIG. 6, which is a schematic flowchart of a data read/write process performed by the memory read/write control unit 105 and the memory 101 in FIG. 5, including:

A specific process of data reading A1 is as follows:

A11: A Linux block device subsystem initiates a service data read request, where the read request carries an LBA (Logic Block Address, logic block address).

A12: The memory read/write control unit 105 calculates an offset of requested service data in the memory according to the LBA address in the read request.

As an optional implementation manner, the calculating an offset in the memory in this step may be implemented in the following manner:

If the memory continuously preempts and pre-applies for a segment of a physical memory from DRAM_start to DRAM_start+DRAM_size, the calculation method is as follows:

DRAM_offset(LBA)=DRAM_start+LBA

If the memory is preempted by segment and occupation of N segments of a physical memory are pre-applied for, a size of each segment of the physical memory is DRAM_SEG_size, each segment of the physical memory is continuous itself, and segments may be discontinuous; all segment start addresses are saved in an array DRAM_base[N]; and the calculation method is as follows:

DRAM_offset(LBA)=DRAM_base[LBA/DRAM_SEG_size]+(LBA % DRAM_SEG_size

A13: The memory read/write control unit 105 requests the service data from the memory 101 according to the memory offset.

That is, the memory read/write control unit 105 acquires the data from the memory 101 according to the memory offset and saves the data in a cache pre-allocated by the block device subsystem.

A24: The memory 101 returns a write success to the memory read/write control unit 105.

A25: The memory read/write control unit 105 converts the service data written into the memory 101 to log data and writes the converted log data into log space of the first non-volatile storage unit 103 in a continuous writing manner.

The log space of the first non-volatile storage unit 103 may adopt a cycle use mode. After the persistency control unit 106 stores the log file of the service data in the second non-volatile storage unit 104, space occupied by the log file of the corresponding service data in the first non-volatile storage unit 103 is released, and released space becomes new available log space. As described in Table 2, space between loc 1 and loc 2 is unavailable, and the space, before loc 1, occupied by the log data on which the persistency control unit 106 has performed persistency is released.

TABLE 2

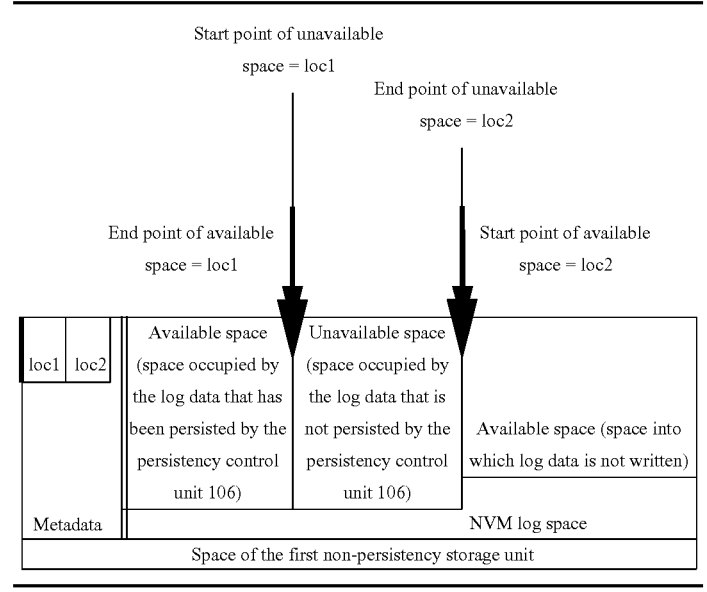

A14: The memory read/write control unit 105 acquires the data in the memory.

A15: The memory read/write control unit 105 returns the read data to the block device subsystem.

Because the memory 101 includes all service data that needs to be read, and compared with cache management such as a traditional cache query, in the manner of acquiring the memory offset in step A12, a time overhead and a space overhead are very small, the foregoing service data read process improves the service data read efficiency.

A specific process of data reading A2 in FIG. 5 is as follows:

A21: The block device subsystem initiates a service data write request, where the write request carries an LBA address.

A22: The memory read/write control unit 105 calculates, according to the LBA address in the request, the offset of the requested service data in the memory.

An implementation manner of calculating the offset in the memory in this step is similar to that in step A12, which is not further described herein.

A23: The memory read/write control unit 105 writes the service data into the memory 101 according to the memory offset acquired after the calculation.

A26: The first non-volatile storage unit 103 returns the write success to the memory read/write control unit 105.

A27: The memory read/write control unit 105 returns the write success to the block device subsystem.

A specific implementation manner of writing the service data into the memory 101 (DRAM) in a random writing manner and converting the data to the log file and writing the log file into the first non-volatile storage unit 103 in a continuous writing manner in the embodiment of the present invention is described by using written service data

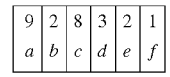

as an example. Refer to FIG. 7, which is a schematic diagram of a specific implementation manner of writing the service data into the memory 101 and the first non-volatile storage unit 103. In FIG. 7, writing into the memory 101 uses the random writing manner, that is, step A22 may use the random writing manner; when the data is written into the first non-volatile storage unit 103, the continuous writing manner is used, that is, the log file "9a2b8c3d2e1f" is written into the log area of the first non-volatile storage unit 103 in step A25.

In the foregoing process of writing the service data, because the memory includes all service data that needs to be stored, in a write processing process, a time overhead and a space overhead for cache management such as a traditional cache query and a cache update do not exist, thereby improving the service data storage efficiency. A completely continuous writing manner can improve the efficiency of writing the log file of the service data into the first non-volatile storage unit 103. The completely continuous writing manner indicates that the data is continuously written into the first non-volatile storage unit 103 and the data in the first non-volatile storage unit 103 is not read during the data writing process.

Figure 8:
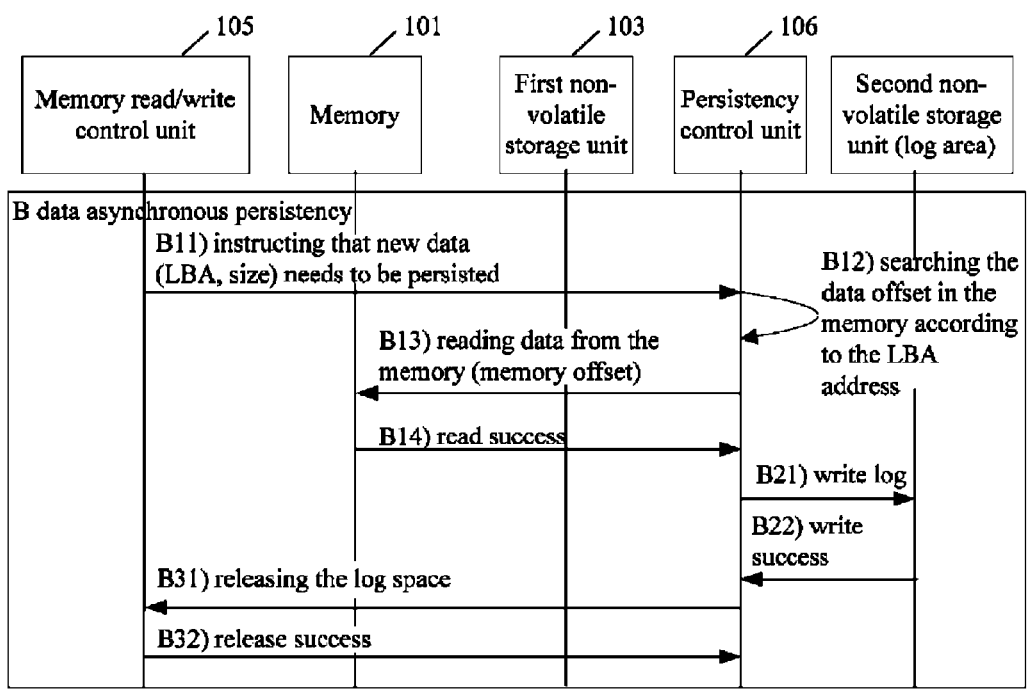
FIG. 8-a is a schematic flowchart of acquiring a log file of first data from a first non-volatile storage unit and performing data persistency in FIG. 5.

FIG. 8-*a* is a schematic flowchart of acquiring a log file of first data from a first non-volatile storage unit and performing data persistency in FIG. 5; as shown in FIG. 8-*a*, a process of acquiring the log file from the first non-volatile storage unit 103 by the second non-volatile storage unit 104 is as follows:

B20': The persistency control unit 106 requests, from the first non-volatile storage unit 103, the log file of the service data to be persisted.

B21': The persistency control unit 106 writes, into the log area of the second non-volatile storage unit 104, the log file to be persisted in the first non-volatile storage unit 103.

B22': After the writing is successful, the persistency storage unit returns a write success message to the persistency control unit 106.

B31': The persistency control unit 106 instructs the memory read/write control unit 105 to release log space occupied by the corresponding log file in the first non-volatile storage unit 103.

B32': The first non-volatile storage unit 103 returns a release success message to the persistency control unit 106.

FIG. 8-*b* is a schematic flowchart of acquiring first data from a memory and performing data persistency in FIG. 5; as shown in FIG. 8-*b*, a process of acquiring the log file from the memory 101 by the second non-volatile storage unit 104 is as follows:

B11: The memory read/write control unit 105 notifies the persistency control unit 106 of that new service data requires persistent storage, where an instruction carries an LBA address and a size Size of the data.

B12: The persistency control unit 106 calculates an offset of the service data, which requires persistent storage, in the memory.

B13: The persistency control unit 106 reads, from the memory 101 according to the memory offset, the data that requires persistency.

B14: The persistency control unit 106 successfully reads the service data that requires persistency.

B21: The persistency control unit 106 converts, to a log format, the service data to be persisted and writes the service data into the log area of the second non-volatile storage unit 104; optionally, the persistency control unit 106 may further directly write, into the data area of the second non-volatile storage unit 104, the service data to be persisted.

A manner for writing the service data into the log area of the second non-volatile storage unit 104 in this step is similar to that in step A25, which is not further described herein.

B22: After the writing is successful, the persistency storage unit returns a write success message to the persistency control unit 106.

B31: The persistency control unit 106 instructs the memory read/write control unit 105 to release the log space, in the first non-volatile storage unit 103, occupied by the service data written in step B21.

B32: The first non-volatile storage unit 103 returns the release success message to the persistency control unit 106.

In the foregoing service data persistency process, in step B13, the persistency control unit 106 directly reads the service data from the memory 101 without reading the service data from the first non-volatile storage unit 103, thereby achieving separation of reading and writing, easing pressure of the first non-volatile storage unit 103, and improving the efficiency of storing the service data in the memory by the first non-volatile storage unit 103.

Figure 9:
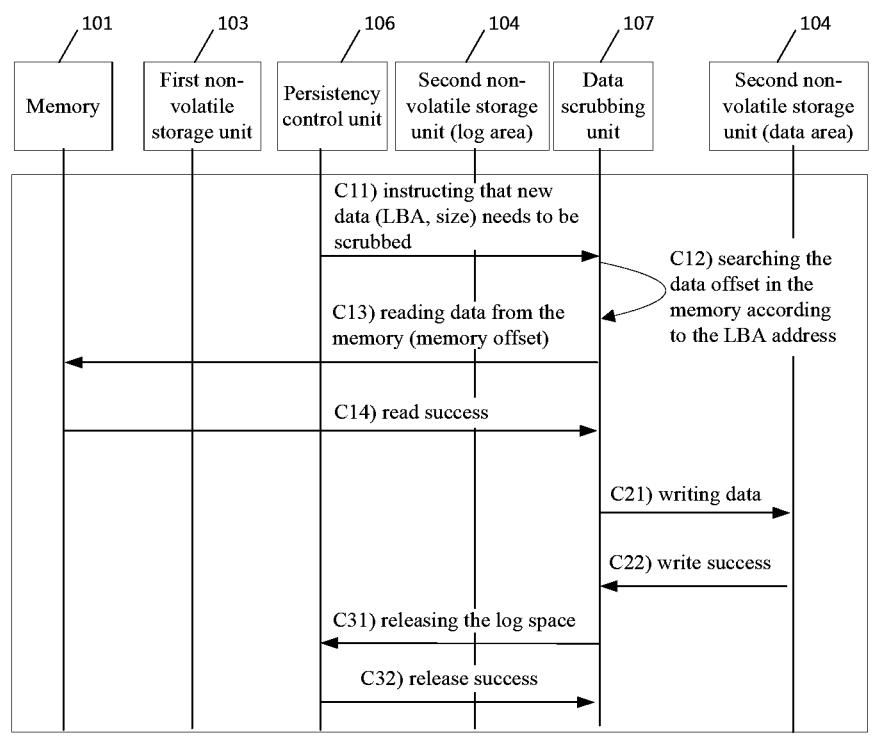
FIG. 9 is a schematic flowchart of writing service data in a memory into a data area of a second non-volatile storage unit by a data scrubbing unit in FIG. 5.

Refer to FIG. 9, which is a schematic flowchart of writing the service data in the memory 101 into the data area of the second non-volatile storage unit 104 by the data scrubbing unit 107 in FIG. 5, including:

C11: The persistency control unit 106 notifies the data scrubbing unit 107 of that new service data needs to be scrubbed, that is, the new service data needs to be written into the data area of the second non-volatile storage unit 104, where the instruction carries the LBA address and a size of the service data to be scrubbed in the memory.

C12: The data scrubbing unit 107 calculates the offset of the service data to be scrubbed in the memory according to the LBA address.

A manner of calculating the memory offset in this step is similar to that in step A12, which is not further described herein.

C13: The data scrubbing unit 107 reads, from the memory 101 according to the calculated memory offset, the data that needs to be written into the data area of the persistency storage unit.

C14: The memory 101 returns a service data reading success message.

C21: The data scrubbing unit 107 writes, into the data area of the second non-volatile storage unit 104, the data to be scrubbed.

C22: The second non-volatile storage unit 104 returns writing success message to the data scrubbing unit 107.

C31: The data scrubbing unit 107 instructs the persistency control unit 106 to delete the log file, in the first non-volatile storage unit 103, of the service data that has been written into the data area of the second non-volatile storage unit 104, to release the space occupied by the service data in the first non-volatile storage unit 103.

C32: The persistency control unit 106 returns a release success message to the data scrubbing unit 107.

In the foregoing implementation method, in step C13, the data scrubbing unit 107 directly reads the service data from the memory 101, thereby easing pressure of the second non-volatile storage unit 104, achieving separation of reading and writing, and improving the efficiency of writing the log file by the second non-volatile storage unit 104.

The foregoing step C21 may also store, to the data space of the second non-volatile storage unit 104 from the log space of the second non-volatile storage unit 104, the service data to be scrubbed; accordingly, the data scrubbing unit 107 instructs the persistency control unit 106 to delete the log file, in the log area, of the service data that has been written into the second non-volatile storage unit 104, to release the log space occupied by the service data in the second non-volatile storage unit 104.

The service data written into the memory 101 is stored in the log area of the first non-volatile storage unit 103 and the log area of the second non-volatile storage unit 104 in the log file form, so that the data lost from the memory 101 can be recovered by using these log files when the service data in the memory 101 (DRAM) is lost due to a restart caused by a failure, for example, the data processing device 100 is powered off. As an optional manner, the data scrubbing unit 107 may convert the log file that has not been written into the log area of the second non-volatile storage unit 104 to the service data first and stores the service data in the data area; if the service data that has not been written into the log area of the second non-volatile storage unit 104 also exists before the data processing device 100 is restarted, because a data storage speed of the first non-volatile storage unit 103 is higher than a data storage speed of the second non-volatile storage unit 104, the data scrubbing unit 107 acquires the log file from the log area of the first non-volatile storage unit 103, converts the log file to the service data, and writes the converted service data into the data area of the second non-volatile storage unit 104.

Figure 10:
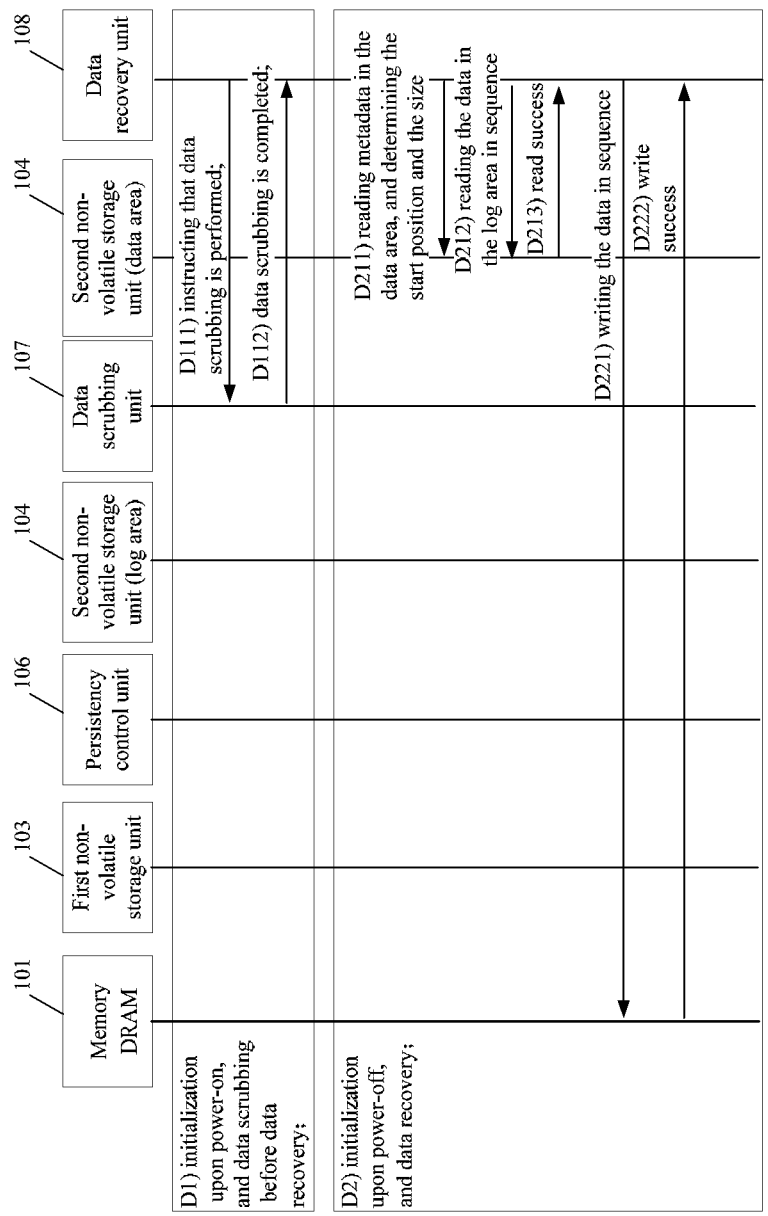
FIG. 10 is a schematic flowchart of a data recovery process performed by a data recovery unit in FIG. 5.

Refer to FIG. 10, which is a schematic flowchart of a data recovery process performed by the data recovery unit 108 in FIG. 5.

In an initialization phase of the data processing device 100, the data recovery unit 108 invokes a sub-data scrubbing unit 107 to perform data scrubbing (step D111 and step D112), to scrub the data that has not been scrubbed before an abnormal power failure or normal powering off. A data recovery process is as follows:

D211: The data recovery unit 108 reads metadata information in the data area of the second non-volatile storage unit 104 and determines a start position and a size of the data to be recovered.

D212: The data recovery unit 108 reads the service data in sequence.

D213: The second non-volatile storage unit 104 returns a read success message.

D221: The data recovery unit 108 writes the read service data into the memory 101 in sequence.

D222: The memory 101 returns a service data write success message to the data recovery unit 108.

The read and write manners in the foregoing sequence can reach a maximum bandwidth throughput and further improve data read and write speed and efficiency.

As an optional implementation manner, the foregoing data scrubbing and recovery may be concurrently performed, that is, step D111 and step D 221 may be performed at the same time. If the data in the memory 101 is lost during a data scrubbing process, the data lost from the memory 101 is recovered by using the log files of the data that has been scrubbed and has not been scrubbed. If the data in the memory 101 is lost after the data in the memory 101 is written into the first non-volatile storage unit 103 but before the log file is written into the second non-volatile storage unit 104, the data lost from the memory 101 is recovered by using the log file in the first non-volatile storage unit 103.

The implementation manner shown in FIG. 5 is a technical solution implemented on the server side. As an optional implementation manner, the data processing device and method in the embodiments of the present invention may further be implemented on a storage side and in a hardware card. Implementing the foregoing data processing device and method on the storage side can achieve a fact that all service data that needs to be stored is stored in the memory shared by remote ends. For the implementation in the hardware card, the hardware card that provides a function of the data processing device in the embodiment of the present invention and can implement the data processing method in the embodiment of the present invention can be connected to a server for implementation.

A person of ordinary skill in the art may be aware that, with reference to the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device, or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing device, comprising:
   a control unit;
   a memory coupled to the control unit;
   a first non-volatile storage unit coupled to the control unit; and
      a second non-volatile storage unit coupled to the first non-volatile storage unit and the control unit,
   wherein a data write speed of the first non-volatile storage unit is higher than a data write speed of the second non-volatile storage unit,
   wherein the control unit is configured to write first data into the memory, write the first data into the first non-volatile storage unit in a log file form, and write, into the second non-volatile storage unit, a log file of the first data written into the first non-volatile storage unit,
   wherein the control unit is further configured to write a second data into the memory, and write the second data into the first non-volatile storage unit in the log file form, and when writing the second data into the first non-volatile storage unit in the log file form, suspend writing the log file of the first data in the first non-volatile storage unit into the second non-volatile storage unit.

2. The data processing device according to claim 1, wherein the control unit comprises a data recovery unit configured to recover the first data, when the first data is lost from the memory using the log file of the first data in the second non-volatile storage unit, and recover the second data, when the second data is lost from the memory using a log file of the second data in the first non-volatile storage unit.

3. The data processing device according to claim 1, wherein the control unit is further configured to: after the log file of the first data in the first non-volatile storage unit is written into the second non-volatile storage unit, instruct the first non-volatile storage unit to release a space occupied by the log file of the first data.

4. The data processing device according to claim 1, wherein the data write speed of the first non-volatile storage unit is the same as a data write speed of the memory.

5. A data processing device, wherein the data processing device comprises a control unit, a memory, a first non-volatile storage unit, and a second non-volatile storage unit; a data write speed of the first non-volatile storage unit is higher than a data write speed of the second non-volatile storage unit; and
   the control unit is configured to write first data into the memory, and write the first data into the first non-volatile storage unit in a log file form; and
   the control unit is further configured to
      acquire the first data from the memory, and convert the acquired first data to a log file and write the converted log file into the second non-volatile storage unit, and acquire the first data from the memory and write the first data into the second non-volatile storage unit.

6. The data processing device according to claim 5, wherein the control unit comprises a memory read/write control unit and a persistency control unit, wherein
   the memory read/write control unit is configured to write the first data into the memory, and write the first data into the first non-volatile storage unit in the log file form; and
   the persistency control unit is configured to implement one of the following:
      (a) acquiring the first data from the memory, and converting the acquired first data to a log file and writing the converted log file into the second non-volatile storage unit, and
      (b) acquiring the first data from the memory and writing the first data into the second non-volatile storage unit.

7. The data processing device according to claim 5, wherein the memory read/write control unit is further configured to write second data into the memory, and write the second data into the first non-volatile storage unit in the log file form.

8. The data processing device according to claim 5, wherein the control unit comprises a data recovery unit configured to recover the first data, when the first data is lost from the memory using the log file of the first data in the second non-volatile storage unit, and recover the second data, when the second data is lost from the memory using a log file of the second data in the first non-volatile storage unit.

9. The data processing device according to claim 5, wherein the data write speed of the first non-volatile storage unit is the same as a data write speed of the memory.

10. A data processing method, wherein the data processing method is applied in a data processing device and comprises:
    receiving first data to be written into a memory of the data processing device;
    writing the first data into the memory, and writing the first data into a first non-volatile storage unit in a log file form;
    writing, into a second non-volatile storage unit, a log file of the first data written into the first non-volatile storage unit, wherein a data write speed of the first non-volatile storage unit is higher than a data write speed of the second non-volatile storage unit;
    writing a second data into the memory, and writing the second data into the first non-volatile storage unit in the log file form; and
    when the second data is written into the first non-volatile storage unit in the log file form, suspending writing the log file of the first data in the first non-volatile storage unit into the second non-volatile storage unit.

11. The data processing method according to claim 10, wherein:
    when the first data in the memory is lost, recovering the first data lost from the memory using the log file of the first data in the second non-volatile storage unit; and
    when the second data in the memory is lost, recovering the second data lost from the memory using a log file of the second data in the first non-volatile storage unit.

12. The data processing method according to claim 10, wherein after the writing, into a second non-volatile storage unit, a log file of the first data in the first non-volatile storage unit, instructing the first non-volatile storage unit to release a space occupied by the log file of the first data.

13. The data processing method according to claim 10, wherein the data write speed of the first non-volatile storage unit is the same as a data write speed of the memory.

14. A data processing method, wherein the data processing method is applied in a data processing device and comprises:
    receiving first data to be written into a memory of the data processing device;
    writing the first data into the memory, and writing the first data into a first non-volatile storage unit in a log file form; and
    converting the first data in the memory to a log file and writing the converted log file into a second non-volatile storage unit, writing the first data in the memory into the second non-volatile storage unit, wherein a data write speed of the first non-volatile storage unit is higher than a data write speed of the second non-volatile storage unit.

15. The data processing method according to claim 14, further comprising:
    writing second data into the memory, and writing the second data into the first non-volatile storage unit in the log file form.

16. The data processing method according to claim 15, wherein:
    when the first data in the memory is lost, recovering the first data lost from the memory using the log file of the first data in the second non-volatile storage unit; and
    when the second data in the memory is lost, recovering the second data lost from the memory using a log file of the second data in the first non-volatile storage unit.

17. The data processing method according to claim 14, wherein the recovering the first data lost from the memory using the first data in the second non-volatile storage unit comprises:
    determining whether a conversion from the log file of the first data to the first data is completed;
    when the conversion is not completed, recovering the first data in the memory using the converted first data and the log file of the first data that is not converted; and
    when the conversion is completed, recovering the first data in the memory using the converted first data.

18. The data processing method according to claim 14, wherein the data write speed of the first non-volatile storage unit is the same as a data write speed of the memory.

* * * * *